United States Patent
Immel et al.

(10) Patent No.: US 12,017,162 B2
(45) Date of Patent: Jun. 25, 2024

(54) FILTER ELEMENT HAVING POTTED GASKET END CAP ASSEMBLY

(71) Applicant: Caterpillar Inc., Deerfield, IL (US)

(72) Inventors: Jon T. Immel, Chillicothe, IL (US); Darrell L Morehouse, III, Bedford, TX (US); Jeffrey R. Ries, Metamora, IL (US); Javier A. Rodriguez, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 1358 days.

(21) Appl. No.: 16/443,239

(22) Filed: Jun. 17, 2019

(65) Prior Publication Data

US 2020/0391142 A1    Dec. 17, 2020

(51) Int. Cl.
 *B01D 29/31* (2006.01)
 *B01D 35/00* (2006.01)
 *B01D 35/30* (2006.01)

(52) U.S. Cl.
 CPC .......... *B01D 29/31* (2013.01); *B01D 35/005* (2013.01); *B01D 35/306* (2013.01); *B01D 2201/291* (2013.01); *B01D 2201/304* (2013.01)

(58) Field of Classification Search
 None
 See application file for complete search history.

(56) References Cited

U.S. PATENT DOCUMENTS

| | | | |
|---|---|---|---|
| 4,411,788 A | 10/1983 | Kimura | |
| 6,626,299 B1 * | 9/2003 | Brown | B01D 35/31 210/450 |
| 6,706,087 B1 * | 3/2004 | Gebler | B01D 29/21 55/498 |
| 6,843,377 B1 | 1/2005 | Roll | |
| 7,361,271 B2 | 4/2008 | Merritt et al. | |
| 7,531,090 B1 | 5/2009 | Stamey, Jr. | |
| 8,083,074 B2 | 12/2011 | South et al. | |

(Continued)

FOREIGN PATENT DOCUMENTS

| | | |
|---|---|---|
| CN | 106068151 | 11/2016 |
| CN | 106132504 | 11/2016 |

(Continued)

OTHER PUBLICATIONS

Official Notice of Rejection for Int'l. Patent Appln. No. 2021-575216, dated Jan. 10, 2023 (3 pgs).

*Primary Examiner* — Jonathan M Peo

(57) ABSTRACT

The present disclosure relates to a filter element for use in a fluid filter system is disclosed herein. The filter element comprises a filter medium having a longitudinal axis between a first end and a second end, and an end cap assembly attached to the first end of the filter medium. The end cap assembly includes a first end cap aligned with the longitudinal axis and proximate to the first end of the filter medium; a first member concentric with and disposed radially apart from the first end cap and the filter medium and axially between the first end cap and the second end of the filter medium; and a plurality of arms connecting the first end cap with the first member, each arm configured to align the filter element with respect to the container and base plate by absorbing alignment discrepancies between at least the base plate and container.

14 Claims, 8 Drawing Sheets

(56) References Cited

U.S. PATENT DOCUMENTS

| | | | |
|---|---|---|---|
| 8,128,719 B1* | 3/2012 | Heckel | B01D 46/521 |
| | | | 55/300 |
| 8,419,938 B2 | 4/2013 | Ries et al. | |
| 8,440,081 B2 | 5/2013 | Wieczorek | |
| 2002/0162781 A1 | 11/2002 | Demirdogen | |
| 2003/0094408 A1 | 5/2003 | Schuyler et al. | |
| 2007/0084169 A1 | 4/2007 | Ehrenberg | |
| 2009/0127198 A1 | 5/2009 | Salvador | |
| 2010/0294707 A1 | 11/2010 | Abdalla | |
| 2011/0132828 A1* | 6/2011 | Ries | B01D 29/21 |
| | | | 210/232 |
| 2013/0043181 A1 | 2/2013 | Krull | |
| 2016/0273688 A1 | 9/2016 | Considine, Jr. | |
| 2016/0279547 A1 | 9/2016 | Jainek | |
| 2017/0304750 A1 | 10/2017 | Malgorn et al. | |
| 2017/0340993 A1 | 11/2017 | Zhibin | |

FOREIGN PATENT DOCUMENTS

| | | |
|---|---|---|
| DE | 1933283 | 1/1971 |
| DE | 102014001787 | 8/2015 |
| DE | 102014005348 | 10/2015 |
| DE | 102016000340 | 7/2017 |
| EA | 3489 | 6/2003 |
| EP | 844012 | 5/1998 |
| EP | 0844012 | 8/2003 |
| GB | 190825213 | 3/1909 |
| JP | 2000501991 | 2/2000 |
| RU | 2480613 | 4/2013 |

* cited by examiner

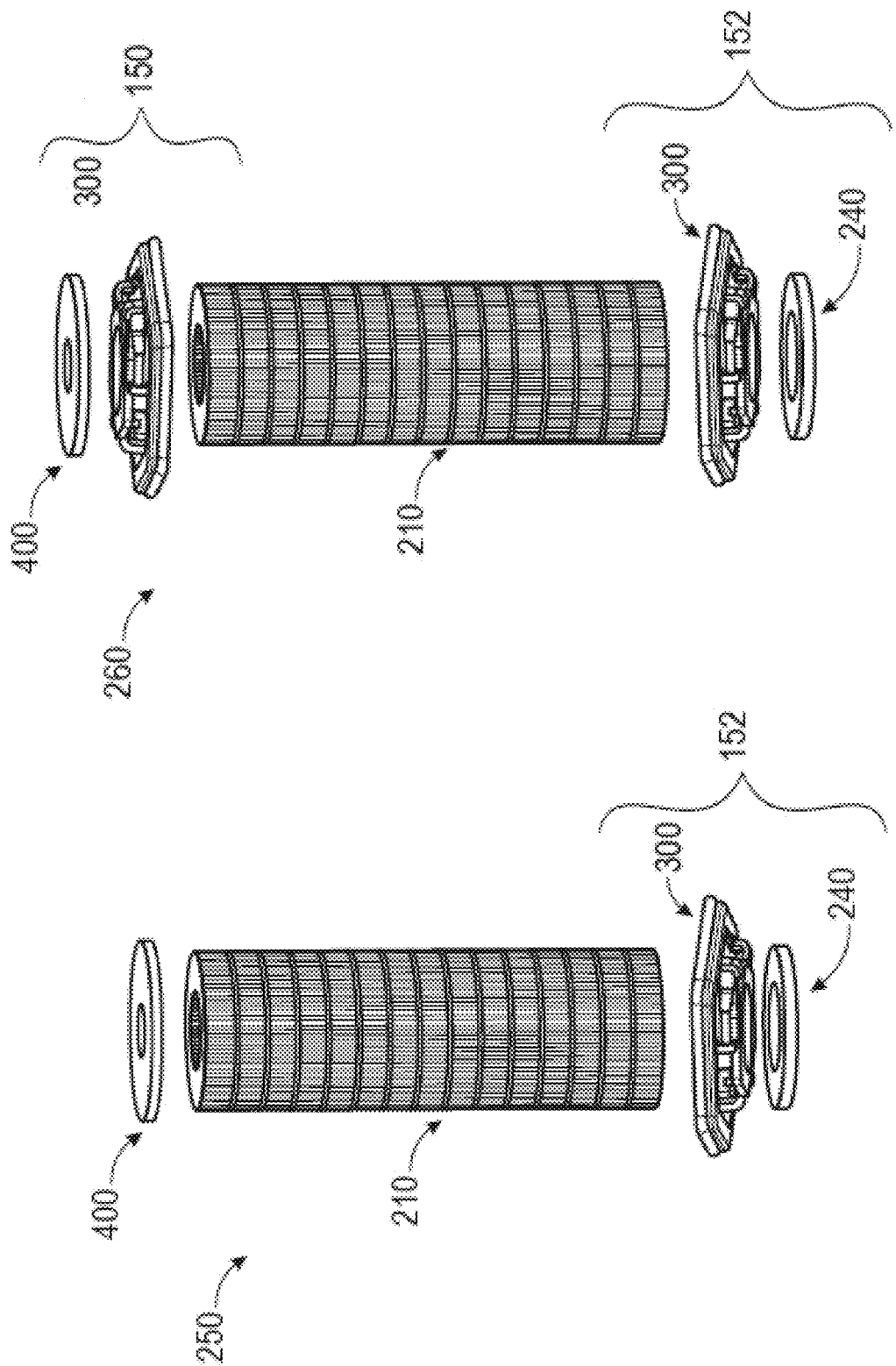

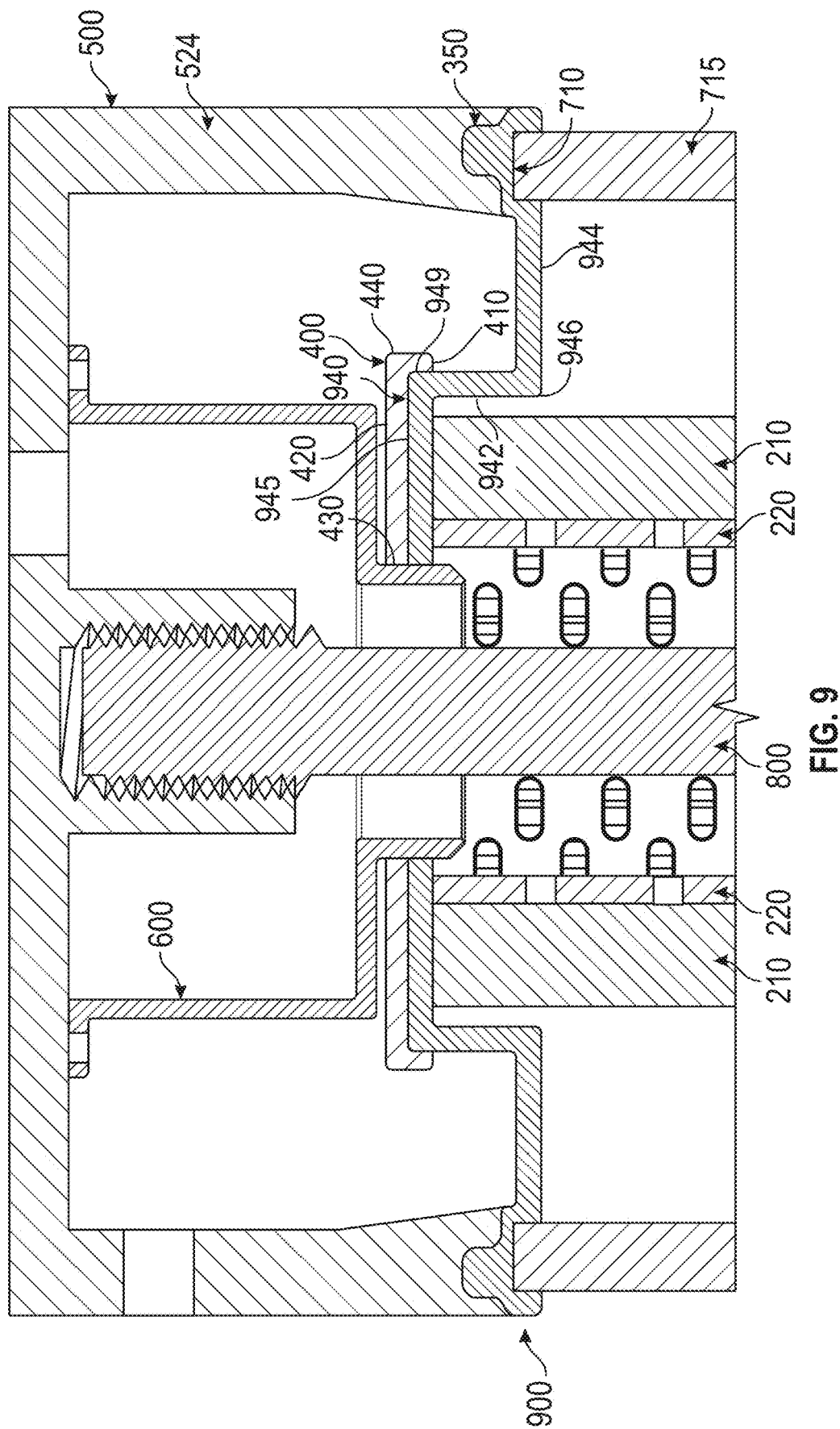

FILTER ELEMENT HAVING POTTED GASKET END CAP ASSEMBLY

TECHNICAL FIELD

The present disclosure relates to filters and, more particularly, to fluid filter systems.

BACKGROUND

Cartridge style fluid filters, such as, for example, fuel or lubricant filters associated with an engine, typically include a replaceable filter element contained within a canister that is threadingly engaged to the engine. Unfiltered fluid, e.g., fuel or lubricant, is received by the filter via an inlet port, particulates are removed from the unfiltered fluid via the filter element, and filtered fluid is delivered to the engine via an outlet port. The filter element often includes a generally cylindrical filter medium, e.g., fabric or other porous material, supported within the canister via one or more endcaps, such that unfiltered fluid flows through the filter medium in a generally radial direction. An endcap typically supports and/or positions the filter medium within the canister and with respect to the inlet and outlet ports. Fluid filters usually also include one or more seals that sealingly separate the inlet and outlet ports to reduce or eliminate unfiltered fluid from bypassing the filter medium.

Typically, the filter elements of such fluid filters are frequently replaced to reduce pressure drop across the filter medium, avoid deterioration of the seals, and/or otherwise attempt to ensure the fluid filter operates as desired. To replace a filter element, the canister is usually unthreaded from the engine, the seals between the inlet and outlet flows are unseated, the old filter element is removed from the canister, a new filter element is inserted, and the canister is rethreaded on the engine. An operator replacing a filter cartridge might prime the canister with fluid to avoid and/or reduce entrapped air within the fluid system. This priming fluid is often previously used and/or unfiltered fluid and priming the canister may require great care to avoid priming fluid from being placed on the downstream side, i.e., the filtered fluid side, of the filter medium. Additionally, proper reseating of the seals, either the old seals or new seals, during filter cartridge replacement is desirable to provide sufficient sealing between the inlet and outlet ports and, thus, to reduce unfiltered fluid from bypassing the filter medium. Unfiltered and/or priming fluid downstream of the filter medium, either from insufficient sealing and/or from operator priming, may result in damage to one or more engine components during operation.

U.S. Pat. No. 6,626,299 ("the 299 patent") issued to Brown et al. discloses a filter cartridge for use in a filter system. A pleated paper filter media is formed into a cylinder, and end caps at the axial ends of the cylinder hold the shape of the filter. Sealing gaskets are associated with the end caps. At least one side has a radial seal formed at the outer periphery of the filter cartridge to protect the associated end cap from a higher pressure region found at the outer periphery. The other axial end can have a similar radial filter in some applications, or in other applications, where flow at that end of the filter is not desired, can utilize an axial seal specially configured to protect the associated end cap from higher pressure at the outer periphery. Maintenance of lower pressure at the respective end caps places any axial loads on the filter in tension, and thereby prevents the application of axial crushing loads on the filter cartridge.

The present disclosure is directed toward overcoming one or more of the problems discovered by the inventors.

SUMMARY

A filter element for use in a fluid filter system is disclosed herein. The filter element comprises a filter medium having a first end and a second end opposite the first end and a longitudinal axis between the first end and the second end, and at least one end cap assembly fixedly attached to at least one end of the filter medium. The at least one end cap assembly including an end cap having a first toroidal shape with a filter element outlet aligned with the longitudinal axis and proximate to the at least one end of the filter medium; a first member having a second toroidal shape concentric with the end cap with respect to the longitudinal axis, the first member disposed radially apart from the end cap and the filter medium and disposed axially between the end cap and the other end of the filter medium; and a plurality of arms connecting the end cap with the first member, each arm comprises a first portion extending from the end cap to an intersection portion and a second portion extending from the intersection portion to the first member, the second portion angularly offset from the first portion.

In another aspect, a replaceable filter element for use in a fluid filter system of a machine is disclosed herein. The fluid filter system comprises a container and a base plate for housing the filter element within a filter element chamber therebetween. The filter element comprises a filter medium having a first end and a second end axially opposite the first end and arranged to filter unfiltered fluid, the filter medium surrounding an interior space arranged to receive filtered fluid from the filter medium; a first end cap mated to the first end of the filter medium and aligned with the interior space, the first end cap arranged to deliver the filtered fluid to the machine; a first member concentric with the first end cap and formed radially apart from the first end cap and the filter medium and axially offset from the first end cap toward the second end of the filter medium, the first member comprising an sealing means comprising configured to lockingly engage with the base plate and the container forming to seal the fluid filter system; and an aligning means comprising a plurality of arms connecting the first end cap with the first member and configured to at least one of bend, flex, elongate, compress, or a combination thereof to align the filter element with respect to the container and base plate by absorbing alignment discrepancies between at least the base plate and container.

In another aspect, a fluid filter system is disclosed herein. The fluid filter system comprises a container having an end wall and an outer wall connecting the end wall to a lip forming a container cavity, the container having a first longitudinal axis between the end wall and the container cavity; a base plate having a base plate cavity aligned along the first longitudinal axis and adjacent to the container cavity, the base plate comprising a top wall opposite the base plate cavity and connected to a base plate side wall, the base plate coupled to the container forming a chamber therebetween; and a filter element positioned housed within the chamber. The filter element comprises a filter medium having a first end adjacent to the end wall of the container, a second end adjacent to the base plate, a second longitudinal axis between the first end and the second end; and an end cap assembly fixedly attached to the first end of the filter medium. The end cap assembly includes a first end cap having a filter element outlet aligned with the second longitudinal axis and proximate to the first end of the filter medium; a first member concentric with the first end cap with respect to the second longitudinal axis and between the side wall of the base plate and the lip of the container, the first member disposed radially apart from the first end cap and the filter medium and disposed axially between the first end cap and the second end of the filter medium; and a plurality of arms comprising an elastomeric material and connecting the first end cap with the first member, each arm comprises a first portion extending axially from the first end cap to an intersection portion and a second portion extending radially from the intersection portion to the first member, the second portion angularly offset from the first portion, wherein the plurality of arms are configured to align the filter element with respect to the base plate and the container.

BRIEF DESCRIPTION OF THE FIGURES

The details of embodiments of the present disclosure, both as to their structure and operation, may be gleaned in part by study of the accompanying drawings, in which like reference numerals refer to like parts, and in which:

FIG. 7 and FIG. 8 are an exploded perspective views of example filter elements of the fluid filter system of FIG. 1, with the container and base plate removed;

FIG. 9 is a cross-sectional view of the fluid filter system of FIG. 1 taken along a cross-sectional plane B having another example gasket.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

As used herein, the term "toroidal" is used to refer to a surface that substantially or completely surrounds a central or longitudinal axis having a hole (referred to herein as an opening, outlet, space, etc.) forming a solid body. That is, a toroidal shape as used herein may refer to a torus or ring-like structure, toroid (e.g., any geometric surface revolved about the longitudinal axis forming a solid body) and/or toroidal polyhedron (e.g., ring-like shape having a polygon planar view when viewed from a plane perpendicular to the longitudinal axis). Geometric shapes for forming a toroid may include, but are not limited to, squares, rectangles, pentagons, etc. Furthermore, toroidal shapes may be cylindrical or tubular and may have any planar viewed shape, such as but not limited to, circular, square shaped, rectangular, pentagon shaped, hexagonal shaped, etc.

As used herein, the term "concentric" may be used to refer to any one or more shapes or structures having a common center such that a larger structure substantially or completely surrounds the smaller structure.

Figure 1:
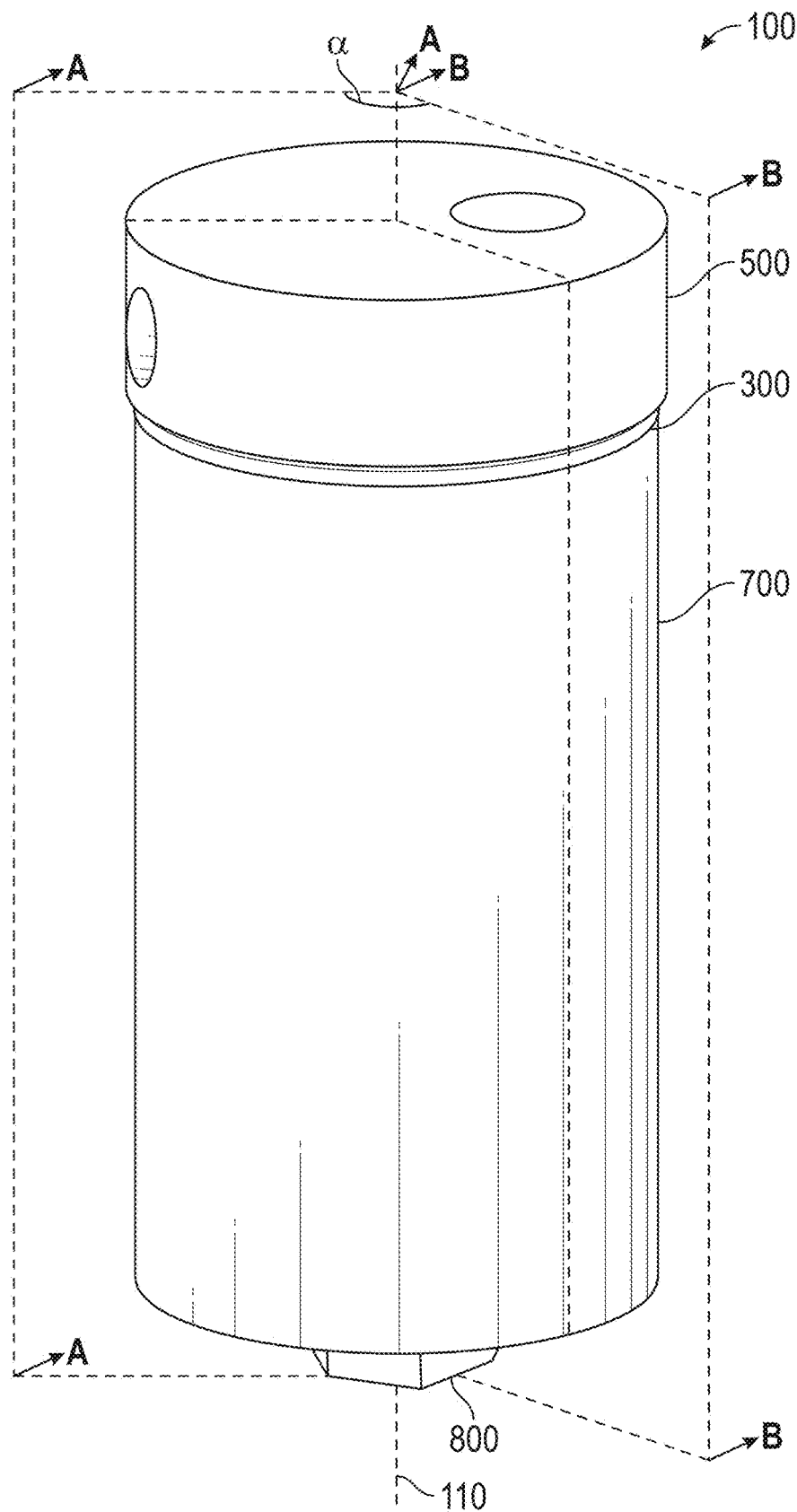
FIG. 1 is a perspective view of a fluid filter system in accordance with the present disclosure.

FIG. 1 illustrates a perspective view of an embodiment of a fluid filter system 100 for use in a machine (e.g., an engine). Fluid filter system 100 may include a base plate 500, a container 700, and end cap assembly 150 aligned along a longitudinal axis 110. The disclosure may reference a top end or top and a bottom end or bottom. Generally, references to the top end and top are towards a top wall 515 of base plate 500. Generally, references to the bottom end and bottom are towards the end wall 720 of the container 700. FIG. 1 also illustrates example cross-section plane A and plane B having an angle α therebetween. The angle therebetween is selected for illustrative purposes only for the illustrated embodiments herein, and may be different for different implementations within the scope of the present disclosure.

Fluid filter system 100 may be one of several components within a fluid system (not shown) and may be configured to receive unfiltered fluid from one or more upstream components of the fluid system, trap particles suspended within the unfiltered fluid, i.e., filter the fluid, and provide filtered fluid to one or more downstream components of the fluid system. The fluid system may include any type of fluid system, e.g., a fuel delivery system, a lubricating system, and/or a coolant system, and may or may not be operatively associated with an engine (not shown). Additionally, fluid filter system 100 may be configured to filter any type of fluid, such as, for example, gasoline, diesel fuel, lubricating oil, water, coolant, and/or any other type of fluid. It is contemplated that the fluid of the fluid system may or may not be pressurized and, if so, may be at any pressure.

Figure 2:
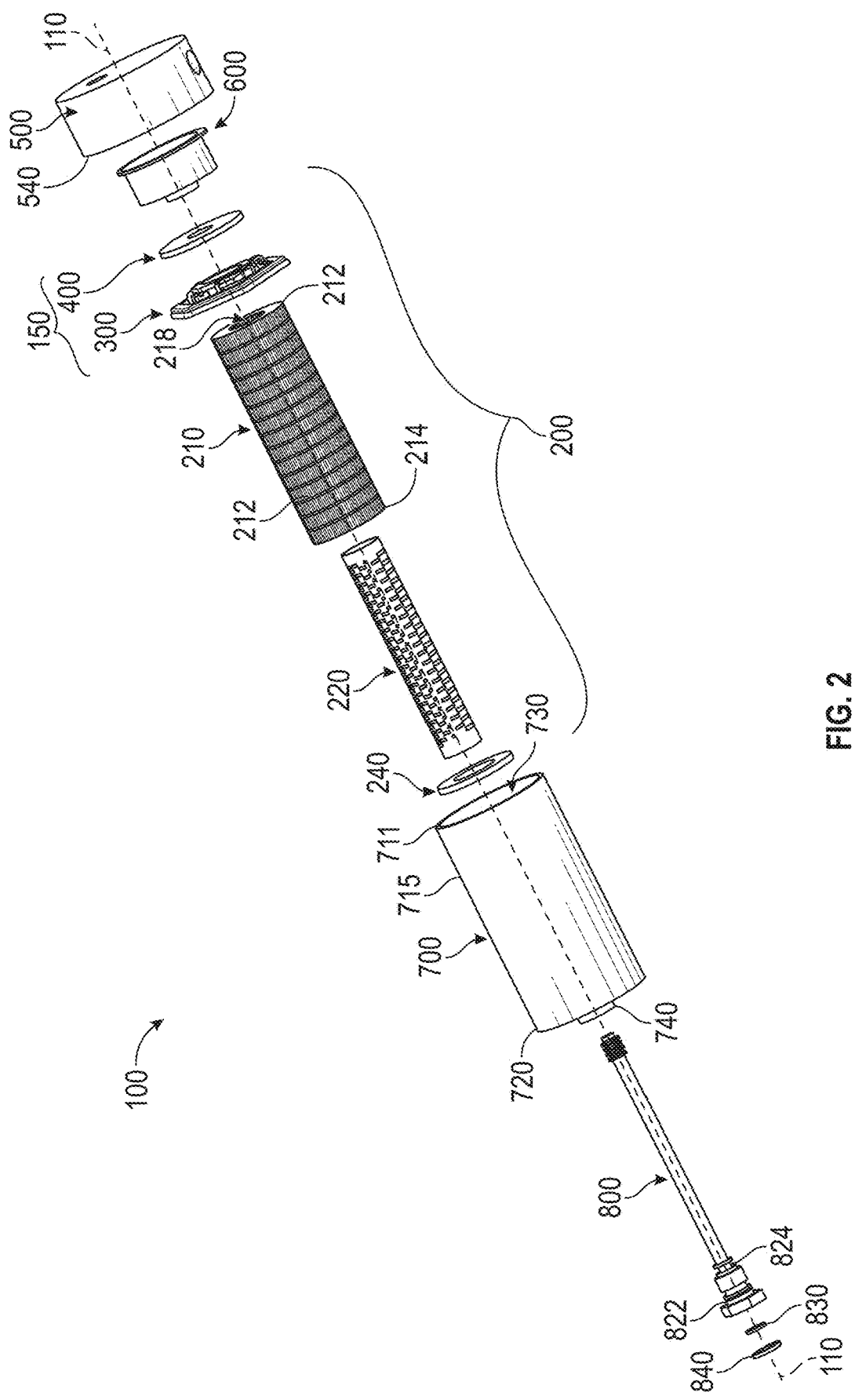
FIG. 2 is an exploded perspective view of the fluid filter system of FIG. 1.

FIG. 2 illustrates an exploded perspective view of the fluid filter system 100. As in FIG. 1, the fluid filter system 100 may include a container 700 and base plate 500. The fluid filter system 100 may also include a filter element 200 and outlet partition 600 aligned along the longitudinal axis 110 and housed between the base plate 500 and the container 700. A lip 710 of outer wall 715 couples with the side wall 524 of the base plate 500, with at least a portion of the cap assembly 150 therebetween, to fluidly seal (e.g., hermetically) the fluid filter system 100. Furthermore, the container 700 may include a drain boss 740 at the end wall 720 adapted to receive a drain plug 800. Drain boss 740 may be hermetically sealed using one or more of first torus seal member 830 and second torus seal member 840, each positioned within first seal groove 824 and second seal groove 822, respectively, of the drain plug 800. Filter element 200 may include a first a filter medium 210 having an interior space 218 housing a sleeve 220. The filter medium 210 and interior space 218 are positioned between end cap assembly 150 and a second end cap 240 at the first end and second end, respectively. The end cap assembly 150 comprises a first end cap 400 adjacent to the base plate 500 and formed on a potted gasket 300, with the gasket 300 positioned between the first end cap 400 and filter medium 210. Each of the components of the fluid filter system 100 may have a respective longitudinal axis that is aligned along the longitudinal axis 110.

Figure 3:
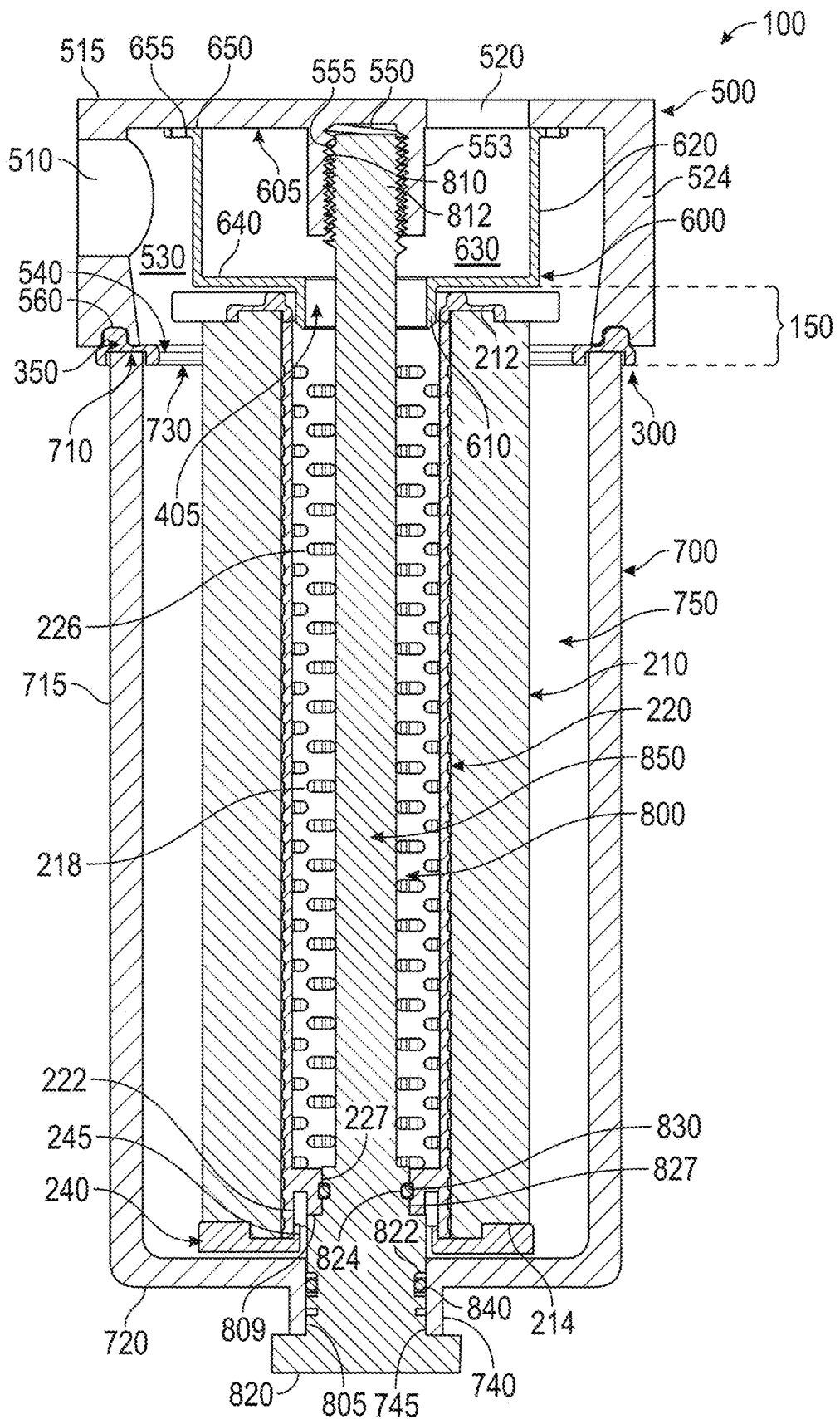
FIG. 3 is a cross-sectional view of the fluid filter system of FIG. 1 taken along a cross-sectional plane A.

FIG. 3 illustrates a cross-sectional view of the fluid filter system 100 taken along the cross-sectional planes A shown in FIG. 1.

Base plate 500 may include a side wall 524, top wall 515, and an open 540 opposite the top wall 515 forming a base plate cavity 540 therebetween. Side wall 524 may be generally toroidal in shape and may include a recessed engagement interface 560 adapted to engage with a seat interface 350 included on gasket 300 thereby providing a means for sealing the fluid filter system 100. Base plate 500 may further comprise an inlet port 510 on the side wall 524 and an outlet port 520 on the top wall 515. Inlet port 510 and outlet port 520 may be configured to connect fluid filter system 100 to, for example, an engine via one or more bolt holes (not referenced). In some embodiments, inlet port 510 and outlet port 520 may each comprise interior threads adapted to receive a corresponding port or component of the engine such that the fluid filter system 100 is fluidly connected to the engine. Inlet port 510 may be configured to receive unfiltered fluid from one or more upstream components of the fluid system and may be configured to direct the unfiltered fluid toward filter element 200 via inlet chamber 530. Specifically, inlet chamber 530 may include a generally annular space surrounded by side wall 524 and top wall 515 and with respect to longitudinal axis 110.

Outlet port 520 may be fluidly connected to outlet partition 600. Outlet partition 600 may include a side wall 620, end wall 640, and opening 605 opposite the end wall 640. Outlet partition 600 may include a generally annular space surrounded by side wall 620 and end wall 640 with respect to longitudinal axis 110. The annular space may be arranged as an outlet chamber 630 configured to fluidly connect the filter element to the outlet port 520. That is, outlet port 520 may be arranged to receive filtered fluid from filter element 200 via outlet chamber 630 and adapted to direct the filtered fluid toward one or more downstream components of the fluid system. Side wall 620 may include a toroidal surface 650 extruding perpendicularly away from the longitudinal axis about the opening 605. The toroidal surface 650 may engage with the top wall 515 of base plate 500 to hermetically seal outlet chamber 630 from the inlet chamber 530. For example, toroidal surface 650 may have one or more through holes 655 evenly spaced radially on toroidal surface 650 through which fasteners (e.g., screws, bolts, rivets, etc.) may attach the outlet partition 600 to the base plate 500. In another embodiment, alone or in combination, an adhesive may attach outlet partition 600 to base plate 500. It is contemplated that inlet and outlet chambers 530, 630 may each define a space within base plate 500 having any shape and/or contour, e.g., multifaceted, at least in part based on the outlet partition 600 and base plate 500.

Outlet partition 600 may also include an outlet boss 610 extruding from the end wall 640 away from outlet chamber 630. Outlet boss 610 may be adapted to interface with the end cap assembly 150, for example, by fitting within a filter element outlet 405 (e.g., opening fluidly connecting interior 118 to the outlet chamber 630) of first end cap 400. In some embodiments, the outlet boss 610 is adapted to form a seal within the filter element outlet 405 to hermetically seal the passage of filtered fluid to the one or more downstream components of the fluid system.

As shown in FIG. 3, the base plate 500 includes a drain boss 553 adapted to receive drain plug 800. The drain boss 553 extends from the top wall 515 toward and, in some embodiments, into outlet chamber 630. Drain boss 553 includes a pocket 550 arranged to receive drain plug 800. In various embodiments, pocket 550 includes a threaded portion 555 having internal threads.

Container 700 may include an outer wall 715 having lip 710 and an end wall 720 forming a container cavity 730 therebetween. Outer wall 715 may be generally toroidal in shape about the container cavity 730 adjacent to the base plate 500 and may be adapted to interface and/or otherwise engage with gasket 300 via seat interface 350 at the lip 710. End wall 720 may be disposed at an end of outer wall 715 opposite container cavity 730. When coupled, the container cavity 730 and base plate cavity 540 may generally define an internal chamber (e.g., a filter element chamber 750) configured to house the filter element 200.

Container 700 may include a drain port that may be configured to facilitate draining of fluid from container 700 and/or may include any relief valve (not shown) to limit a pressure of the fluid of the fluid system. For example, container 700 includes drain boss 740 implemented as a drain port and adapted to receive drain plug 800 via smooth-walled drain bore 745.

FIG. 3 illustrates an example drain plug 800. Drain plug 800 includes a shank 850 having a threaded portion 810 at end 812 adapted to engage complimentary threaded portion 555 of pocket 550 and a head end 820 opposite end 812 arranged to seal drain bore 745. Drain plug 800 also includes a plurality of smooth-wall portions 805 and 827 of differing diameters arranged to interface with drain bore 745 and filter element bore 227 of a filter element boss 222, respectively. A shoulder 809 is between and connects the smoothed-wall portions 805, 827, on which the filter element bore 227 is received. The diameter of smooth-walled portion 827 may be larger than the diameter of smoothed-walled portion 805. Smooth-walled portion 827 may also be surrounded by the second end cap 240 within opening 245. In some embodiments, smooth-walled portion 827 may have a diameter that is less than a diameter of opening 245. Drain plug 800 also includes a first seal groove 824 and a second seal groove 822. First seal groove 824 receives the first torus seal member 830 and second seal groove 822 receives the second torus seal member 840, such as an O-ring seal. First torus seal member 830 is configured to provide a fluid seal between drain plug 800 and filter element bore 227. Second torus seal member 840 is configured to provide a fluid seal between drain plug 800 and drain bore 745. Drain plug 800 may be unscrewed from pocket 550 and extracted from the fluid filter system 100. First torus seal member 830 and second torus seal member 840 emerge from the filter element bore 227 and drain bore 745, respectively, such that fluid flows via the drain bore 745 out of the fluid filter system 100, thereby facilitating removal of fluid.

Filter element 200 may include end cap assembly 150, a second end cap 240, and filter medium 210 therebetween. End cap assembly 150 may be disposed adjacent base plate 500 and may be configured to support filter medium 210 within, and with respect to, container 700 and to provide seals between base plate 500 and container 700 and between inlet chamber 530 and outlet chamber 630, respectively. Filter medium 210 may be configured to trap particulates and/or other particles suspended within a fluid and may include a generally toroidal shape (for example, cylindrical) disposed about and extending along longitudinal axis 110. Filter element 200 may also include a sleeve 220. Sleeve 220 may include a generally toroidal tube disposed radially within interior space 218 or radially outside of filter medium 210 and may include one or more perforations 226 therein configured to allow fluid to flow there through, e.g., from filter medium 210 to interior space 218. A first end 212 of filter medium 210, disposed adjacent base plate 500, may be engaged with, e.g., contact, end cap assembly 150 and a second end 214 of filter medium 210, disposed adjacent to end wall 720 of container 700, may be engaged with, e.g., contact, second end cap 240. The second end of sleeve 220 may comprise filter element boss 222 having therein the filter element bore 227 engaged with the smooth-walled surface 827 of drain plug 800. Second end cap 240 may be disposed adjacent end wall 720 of container 700 and may be configured to support filter medium 210 within, and with respect to, container 700. Second end cap 240 comprises opening 245 through which shank 850 of drain plug 800 passes. Filter medium 210 may include any filter material and/or medium known in the art, such as, for example, fabric or other porous material, and may or may not be pleated. It is also contemplated that second end cap 240 and sleeve 220 may be made from any suitable material, such as, for example, a polymer or other plastic, and may be injection molded. It is further contemplated that perforations 226 may include any shape, size, and/or quantity and that sleeve 220 may be selectively omitted.

Figure 4:
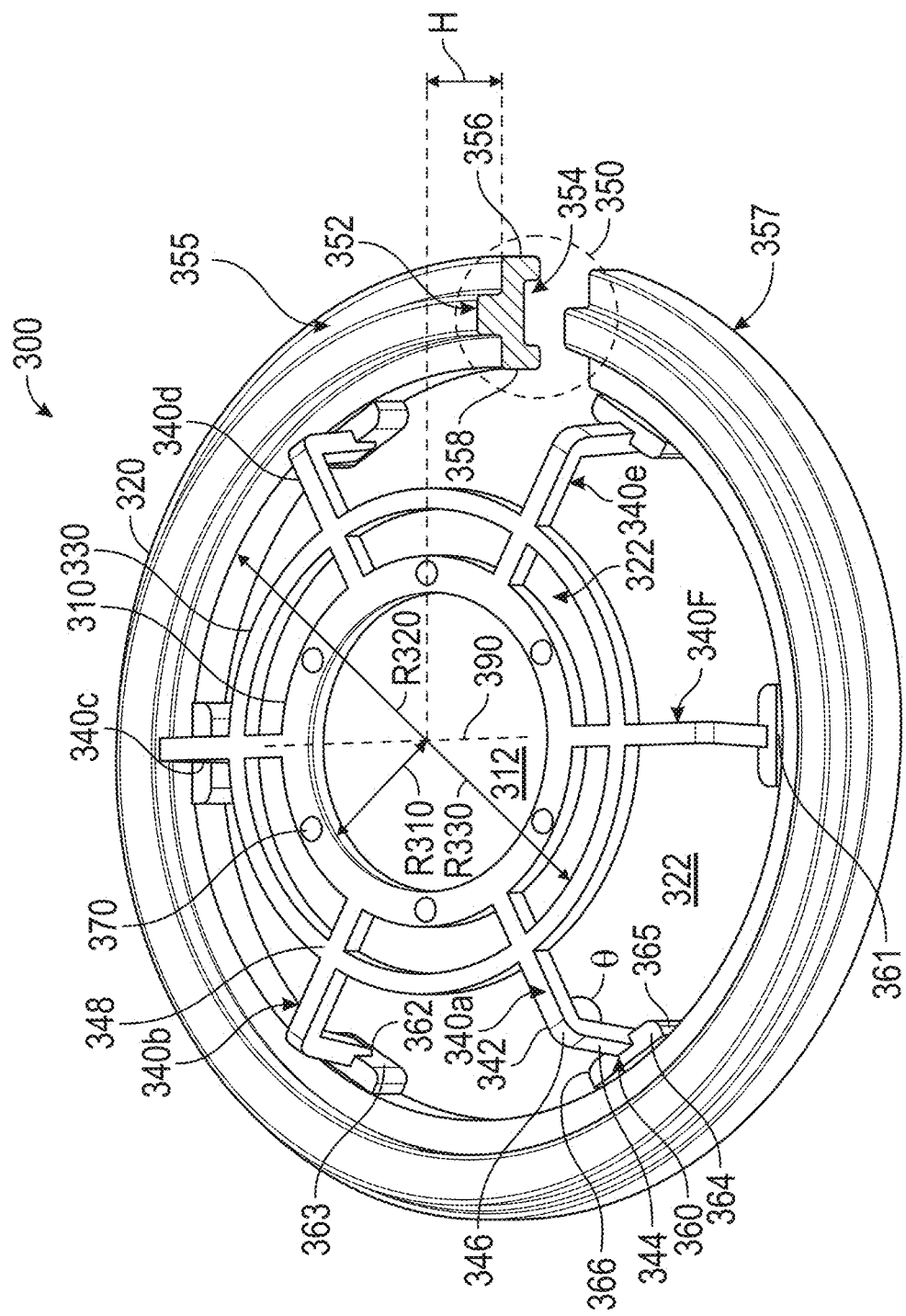
FIG. 4 is a partial cross-sectional, perspective view of an example gasket of the fluid filter system of FIG. 1 with the container and base plate removed.

FIG. 4 illustrates a perspective view of an embodiment of gasket 300 having a partial cross-sectional view of the seat interface 350. Gasket 300 may have a body comprising a plurality of members (e.g., members 310, 320, and 330) that are concentric and radially spaced apart from each other and having a common radial center aligned along longitudinal axis 390. Each member substantially or completely surrounds the perimeter of each smaller member therein. An outer most concentric first member may comprises a second toroidal shape or structure that complements and mates with the container 700 and base plate 500, and surrounds or substantially surrounds the perimeter, viewed from a plane perpendicular to the longitudinal axis 110, of the filter medium 210. At least two concentric members are axially spaced apart along the longitudinal axis at a distance "H" toward the second end 214 of the filter medium 210. The distance H may depend, for example, on dimensions of the filter element; dimensions of the container, cap, and other components of the fluid filter system, and/or a given intended use of the filter element (e.g., a filter element for use in lube based fluid filter systems may be larger than a filter element for use in fuel based fluid filter systems. The body of gasket 300 also comprises a plurality of arms (e.g., arms 340a-f, collectively referred to herein as "arm 340") incrementally disposed about and extending radially from the longitudinal axis 390. The plurality of arms may be positioned at radially equidistant increments about the longitudinal axis 390 and connect the plurality of concentric members to each other forming an integral body. Each arm 340 may comprise a first portion 342 extending radially from at least a second member 310 in a first direction toward at least a first member 320, and a second portion 344 extending axially from the first member 320 toward the second member 310 in a second direction angularly offset (e.g., angle θ) from the first direction and meeting the first portion 344 at an intersection portion 346 (e.g., a bend, turn, etc.). While in some embodiments the angle θ may an obtuse angle, in various embodiments the angle θ may be approximately 90 degrees. At least one of the concentric members comprises a seat interface 350, for example, the outer most member (e.g., first member 320) relative to the longitudinal axis 390 may comprise the seat interface 350. The body of gasket 300 may be formed of any flexible elastomeric material that is capable of withstanding continuous exposure to the fluid that which the filter element is designed to filter (e.g., does not deteriorate in response to exposure to the filtered fluid). In various embodiments, body of gasket 300 may be formed of a material having elastomeric properties, such as a polymer with viscoelasticity (e.g., an elastomer), for example, nitrile rubber (NBR), hydrogenated nitrile butadiene rubber (HNBR), rubber copolymers, fluoroelastomers (FKM), fluorosilicone or fluorovinylmethylsiloxane rubber (FVMQ), and the like.

Specifically, in the illustrated embodiment of FIG. 4, the gasket 300 may include a second member 310 (which may also be referred to herein as a "centering member") generally toroid in shape having a second aperture 312 and adjacent to the longitudinal axis 390, a first member 320 generally toroid in shape (which may also be referred to herein as a "outer seal member") disposed at a radially outer edge of the gasket 300, and a third member 330 generally toroid in shape disposed between the centering member 310 and the outer seal member 320. In the illustrated embodiment, the centering and third members 310, 330 have similar toroid shapes of differing radii (e.g., radii $R_{310}$ and $R_{330}$, respectively), where $R_{330}$ is greater than $R_{310}$. The dimensions of the various radii may be based on the size and shape of the resulting filter element 200, which may be based on the desired application and fluid filter system dimensions. However, centering and third members 310, 330 may have different shapes. Third member 330 may be formed in planar alignment with the centering member 310, for example, one or more of the surfaces of members 310 and 330 may share a common surface plane or a center of mass of the centering member 310 and third member 330 may be aligned on a common plane (e.g., coplanar alignment). The outer seal member 320 is adjacent to the third member 330 opposite the centering member 330 and disposed a lateral distance H along the longitudinal axis 390 from the centering member 310. As illustrated the outer seal member 320 may be wider radially than the centering and/or third member 310, 330. However, other configurations are possible, for example, each member may have the same width or differing widths.

Arms 340a-f extend radially from the centering member 310 and physically connects the centering member 310 to the outer seal member 320. Arms 340a-f are radially disposed at generally equal increments about the longitudinal axis, for example, where there are six arms 340 as in FIG. 4 the arms may be positioned every 60 degrees. However, gasket 300 may comprise more or fewer arms 340, for example, two, three, four, seven, eight, etc. Each arm 340 includes first portion 342 extending radially from the centering member 310, in a direction substantially parallel to the centering member 310 (e.g., perpendicular to the longitudinal axis 390), toward the outer seal member 320 and a second portion 344 extending axially from the outer seal member 320 toward the centering member 310 in a direction angularly offset (e.g., angle θ) from first portion 342. The first and second portions 342, 344 intersect at intersection portion 346. Angle θ may be a right angle or an obtuse angle with respect to the first portion 342. In some embodiments, angle θ may be approximately 90 degrees, or as close to 90 degrees within manufacturing tolerances, which permits the arms 340 to extend past the first end cap 400 without increasing increase the overall diameter of the filter element 200 in which the gasket 300 is included, as detailed herein. Each arm 340 may couple to the outer seal member 320 at a respective coupling interface 360. Coupling interface 360 may have an interfacing surface 361 and arm intersection 362 one or both of a surface 363 opposite the interfacing surface 316 and upper surface 364. The intersection 362 may be generally centered between two fillet ends 365 and 366 connecting the surface 363 to the interfacing surface 361.

The coupling surfacing 360 may be adapted to physically and fixedly connect the outer seal member 320 with the arms 340. Each coupling interface 360, e.g., at least the interfacing surface 361, may be wider along a plane intersecting the longitudinal axis 390 than the respective arm 340 to avoid tearing, breakage, or other separation of the arm 340 from outer seal member 320 during use of the gasket 300. Where third member 330 is present, as illustrated in FIG. 4, the arms 340 may intersect with the third member 330, for example, in the first portion 342 at intersection 348 as illustrated. In some embodiments, the third member 330 may be laterally disposed along the longitudinal axis 390 from the centering member, and the arms 340 may then intersect the third member 330 in the second portion 344. Arms 340 may comprise any geometric shape, length, and/or quantity.

The outer seal member 320, third member 330 and arms 340 may encompass a plurality of first apertures 322, including any shape, length, and/or quantity, between adjacent ones thereof. Similarly, the centering member 310, third member 330 and arms 340 may encompass a plurality of third apertures 332, including any shape, length, and/or quantity, between adjacent ones thereof.

The outer seal member 320 has a toroid shape based on the shape and configuration of the seat interface 350. That is, the outer seal member 320 has a toroid shape based on revolving cross-sectional shape of the seat interface 350 (e.g., as shown in the partial cross-section of FIG. 3). Seat interface 350 may be adapted, for example, to lockingly engage with corresponding interfaces of the base plate 500 and/or container 700 to hermetically seal the fluid filter system 100. FIG. 4 illustrates a non-limiting example of a seat interface 350 that comprises a first engagement interface 352 (also referred to herein as a protruding engagement interface 352) on a top surface 355 of the outer seal member 320 centered at a radii $R_{352}$ and a second engagement interface 354 (also referred to herein as a recessed engagement interface 354) opposite the protruding engagement interface 352 (e.g., on bottom surface 357) centered at a radii $R_{354}$ between first side wall 356 and second side wall 358. As indicated above in connection to FIG. 3, the seat interface 350 may engage with the base plate 500 via protruding engagement interface 352 and corresponding recessed engagement interface 560 and engages with the container 700 via recessed engagement interface 354 arranged to receive the lip 710 of the outer wall 715 between side walls 356 and 358. Engagement of the threaded portion 810 of drain plug 800 in pocket 550 causes the base plate 500 and container 700 to clamp down on the outer seal member 320, held in place via seat interface 350, to hermetically seal the fluid filter system 100. While an example seat interface 350 is illustrated in FIG. 4, it will be appreciated that other configurations are possible without departing from the scope of the present disclosure so long as the gasket 300 is arranged to hermetically seal the fluid filter system 100 via the seat interface 350.

While the seat interface 350 is illustrated as corresponding (e.g., disposed) along the entire length of the outer member 320, it will be appreciated that other configurations are possible. For example, the seat interface 350 may comprises a plurality of sections incrementally positioned (equally spaced or irregularly spaced) along the top surface 355 and/or bottom surface 357. Similarly, protruding engagement interface 352 and recessed engagement interface 354 need not overlap with each other and may be arranged as desired for a particular application.

The gasket 300 also comprises a plurality of raised surfaces 370 disposed on a top surface of the gasket 300. For example, a plurality of raised surfaces 370 may protrude from any one or more surfaces of the gasket 300 and may be equally spaced in the radial direction about the longitudinal axis 390. FIG. 4 illustratively shows six raised surfaces 370 equally spaced apart in the radial direction and protruding from the centering member 310 away from the outer seal member 320. However, in some embodiments, the raised surfaces 370 may include any shape, configuration, translational or radial separate, and/or quantity. For example, the raised surfaces 370 need not be equally spaced apart, and may be disposed haphazardly about the gasket 300. The raised surfaces 370 may be formed on the centering member 310, outer seal member 320, third member 330, and/or one or more arms 340 as desired. Furthermore, the raised surfaces 370 may be generally boxed shaped, generally domed shaped (e.g., partial sphere or oval), generally pyramidal, etc.

While the foregoing description is made with reference to the embodiment shown in FIG. 4, it will be appreciated that other configurations are possible. For example, each member 310, 320, 330 may have any desired geometric shape, for example, generally toroidal shaped (e.g., ring shaped) having a rectangular cross-section with an edge parallel to the longitudinal axis 390 forming a solid body about longitudinal axis 390, as illustrated in FIG. 4. While, in another embodiment, one or more of the members may be generally torus shaped. Further still, when viewed along the longitude axis 390, the centering, outer seal, and third members 310, 320, 330 may be concentric circles (as illustrated in FIG. 4), concentric polygons of the same or different type (e.g., concentric squares, concentric pentagons, concentric hexagons, etc.), or any combination thereof. Furthermore, the plurality of members may comprise any number of members. For example, while FIG. 4 illustrates three members, the gasket 300 may comprise only the centering and outer seal members 310, 320 or may comprise additional members beyond the centering, outer seal, and third members 310-330.

Figure 5:
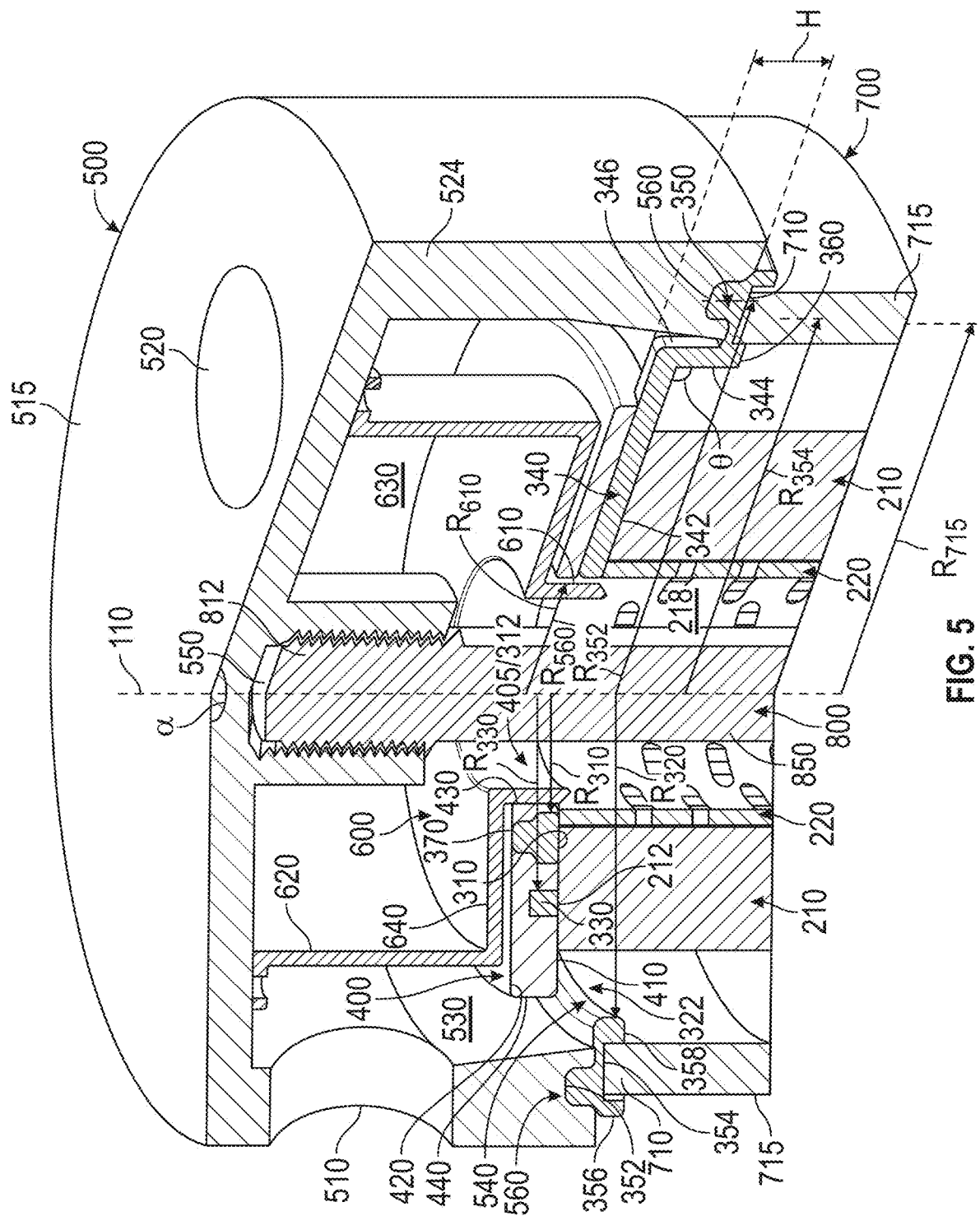
FIG. 5 is an enlarged, cross-sectional, perspective view of the fluid filter system of FIG. 1 taken along the cross-sectional planes A and B.

FIG. 5 is an enlarged, cross-sectional, perspective view of the fluid filter system 100 taken along the cross-sectional planes A and B shown in FIG. 1. FIG. 5 shows cross-section planes A and B having an angle α therebetween. Plane A is used to illustratively show cross-section along a plane parallel with the longitudinal axis 110 and established between raised surface 370 and longitudinal axis 110. Similarly, plane B is used to illustratively show cross-section along a plane parallel with the longitudinal axis 110 and established along the center of mass of an arm 340. Thus, as there are six illustrative raised surfaces 370 and six illustrative arms 340, the angle between planes A and B in this example is 150 degrees. Other illustrative arrangements are possible.

As described in connection to FIG. 2, end cap assembly 150 may be adjacent to the filter medium 210 and between the filter medium 210 and base plate 500, and more particularly, between the filter medium 210 and outlet partition 600. End cap assembly 150 may be engaged with, in contact with, or otherwise coupled to a first end of the filter medium 210.

The end cap assembly 150 may comprise the gasket 300 and first end cap 400. The gasket 300 may be at least partially encapsulated in the first end cap 400. The first end cap 400 comprises a first surface 410 engaged with, e.g., in contact with, the filter medium 210 and a second surface 420 opposite the first surface 410. First end cap 400 may be formed (e.g., coupled, attached, connected, mated) on the first end 212 of the filter medium 210, as described below. The first end cap 400 comprises an inner seal surface 430 that engages with outlet boss 610 within second aperture 312 to provide a fluid seal between inlet chamber 530 and outlet chamber 630 providing a sealed fluid flow for filtered fluid through the interior space 118 to the outlet chamber 630. Specifically, first end cap 400 may include a body having a generally stadium based toroidal shape, having the inner seal surface 430 adjacent to the longitudinal axis 110 and outer surface 440 connected thereto via the first and second surfaces 410, 420. The inner seal surface 430 may have a radius $R_{430}$ that is substantially the same, or even less than, a radius $R_{610}$ of the outlet boss 610, such that upon engagement the outlet boss 610 applies a radial pressure to the inner seal surface thereby fluidly sealing the inlet chamber 530 from the outlet chamber 630. The dimensions of the various radii may be based on the size and shape of the resulting filter element 200, which may be based on the desired application and fluid filter system dimensions (e.g., radii $R_{430}$ and $R_{610}$ are configured such that the outlet boss 610 fits within inner seal surface 430 to fluidly seal the filter element 200). In various embodiments, the first end cap 400 may be formed of a solid setting resin, for example, polymer, urethane, polyurethane, silicone, etc.

The first end cap 400 may substantially encapsulate (e.g., surround, encompass, or otherwise enclose) at least a portion of the gasket 300. That is, at least a portion of the gasket 300 may be substantially within a material of the first end cap 400 such that the portion of the gasket is encapsulated between surfaces 410-440 of the first end cap 400. For example, centering member 310 may be positioned adjacent to the first end 212 of the filter medium 210. In some embodiments, the bottom surface of the centering member 310 may be in contact with the filter medium 210, while in others there may be a space therebetween. The first end cap 400 may be formed around the centering member 310, as described below, thereby substantially encapsulating the centering member 310. Thus, where the centering member 310 is in contact with the filter medium 210, the material of the first end cap 400 may not enclose the area of contact (e.g., the surface of centering member 310 in contact with the filter medium 210 may be coplanar with the second surface 420). In some embodiments, the third member 330 may also be in contact with the filter medium (or spaced apart) in line with the centering member 310, such that the third member 330 is similarly encapsulated by the first end cap 400. Further still, the first portion 342 of the arms 340 may similarly be encapsulated by the first end cap 400, and in some embodiments, a portion of the intersection portion 346 and/or a part of the second portion 344 may be within the first end cap 400. The amount of the arm 340 therein is based on the designed shape of the gasket 300.

The end cap assembly 150 includes the gasket 300 with longitudinal axis 390 aligned with longitudinal axis 110. The gasket 300 includes the outer seal member 320 interfaced with the base plate 500 and container 700 providing a fluid seal between base plate 500 and container 700, as described above. For example, the recessed engagement interface 354 receives the lip 710 of the outer wall 715 at a distal end about the container cavity 730. The recessed engagement interface 354 comprises a radius $R_{354}$ that is substantially equal to and aligned with the radii $R_{715}$ of the outer wall 715. First side wall 356 and second side wall 358 protrude from the base plate 500 toward the end wall 720 of the container and overlap with the received portion of the outer wall 715. Similarly and opposite of the recessed engagement interface 354, protruding engagement interface 352 is received by recessed engagement interface 560 in the side wall 524 of the base plate 500. Thus, recessed engagement interface 560 comprises a radius $R_{560}$ that is substantially equal to and aligned with the radii $R_{352}$ of the protruding engagement interface 352. As described above, engagement of the drain plug 800 in the pocket 550 causes the base plate 500 to be drawn toward the container 700 and vice versa, such that side wall 524 and outer wall 715 exert a clamping or compression force on the outer seal member 320, thereby fluidly or hermetically sealing the fluid filter system 100.

The center of mass of the outer seal member 320 may be laterally disposed relative to the center of mass of the centering member 310 along the longitudinal axis 110 by distance H. As described above, arms 340 couple the outer seal member 320 to the centering member 310, and as such to the first end cap 400. Thus, the first end cap 400 and gasket 300 may form an inseparable body of end cap assembly 150. In some embodiments, outer seal member is spaced apart from the filter medium 210, with a portion of filter medium 210 positioned in first apertures 322. First apertures 322 fluidly connects the inlet chamber 530 with container cavity 730 to permit the filter medium 210 to receive unfiltered fluid from inlet chamber 530.

Figure 6:
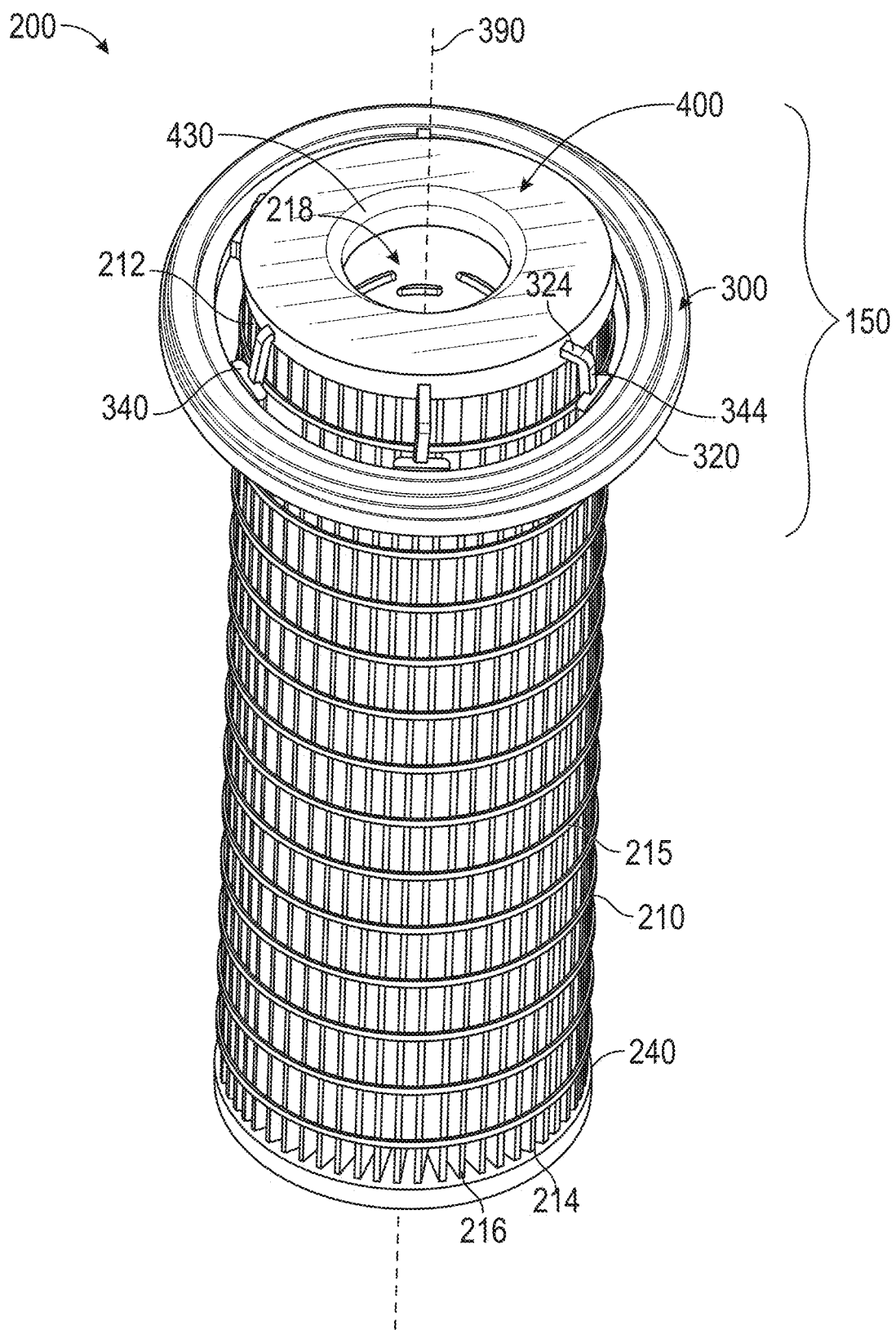
FIG. 6 is a perspective view of a filter element removed from the container and base plate of the fluid filter system of FIG. 1.

FIG. 6 illustrates a perspective view of a filter element 200 without the container 700, base plate 500, outlet partition 600, and drain plug 800. As described herein, the filter element 200 comprises the filter medium 210, sleeve 220, end cap assembly 150, and second end cap 240. In various embodiments, filter element 200 is fixedly formed into an integral body comprising at least the filter medium 210 and end cap assembly 150. In further embodiments, the filter medium 210, sleeve 220, end cap assembly 150, and second end cap 240 are integrally formed. The filter medium 210 may comprise a plurality of radially arranged fins 216 axially extending along the longitudinal length of the filter medium 210. Fins 216 may be attached to a plurality of support rings 215 incrementally disposed along the longitudinal length of the filter medium 210 providing structure support for the fins.

As illustrated in FIG. 6, the filter element 200 comprises the filter medium 210 having first end 212 and second end 214 opposite the first end 212 along the vertical (e.g., longitudinal axis 390. The end cap assembly 150 fixedly attached and/or mated to the first end 212 of the filter medium 210 and includes the first end cap 400 having a first toroidal shape with the filter element outlet 405 aligned with the longitudinal axis 390 and proximate to the first end 212 of the filter medium 210 (e.g., aligned with the interior space 218). The end cap assembly 150 also includes at least the first member 320 concentric with the first end cap 400 and formed radially apart from the first end cap 400 and the filter medium 210 and axially offset from the first end cap 400 toward the second end 214 of the filter medium. The first member 320 may include the seat interface 350. The first member 320 may be substantially surrounding and overlapping the perimeter of the filter medium 210 when viewed along a plane perpendicular to longitudinal axis 390 and formed between the first end cap 400 and second end 214. The plurality of arms 340 may be formed connecting the first end cap 400 with the first member 320. Each arm 240 may have the first portion 342 extending radially from the first end cap 400 to an intersection portion 346 and a second portion 344 extending from the intersection portion to the first member 320, such that the second portion 344 is angularly offset from the first portion 342. In some embodiments, the arms 240 and the first member 320 may be included as part of the gasket 300, for example, having a plurality of members as described herein.

The filter element 200 may be manufactured in any number of processes, a non-limiting example of which is provided herein. The gasket 300 may be formed, for example, by injection molding using a material having elastomeric properties, (e.g., NBR, HNBR, rubber copolymers, and the like injected into a projection mold for the gasket 300 (e.g., a shape complementary and inverse to the gasket 300). The molded gasket 300 may then be placed in a projection mold for the end cap 400. In some embodiments, the mold for the end cap 400 may be a urethane mold (e.g., polytetrafluoroethylene). The mold comprises protrusion of an inverse of filter element outlet 405 (referred to herein as the outlet projection) surrounded an inverse of the desired first end cap 400 shape (referred to herein as the end cap projection). The gasket 300 may be placed within the end cap projection by aligning the second aperture 312 with the protrusion of the inverse of filter element outlet 405 and generally aligning longitudinal axis 390 of the gasket 300 with the outlet projection. The raised surfaces 370 may contact the molding surface to provide proper axial alignment between the gasket 300 and the eventual first end cap 400. A liquid material (e.g., solid setting resin, such as but not limited to, a polymer, urethane, polyurethane, silicone, etc.) for the first end cap 400 may then be potted (e.g., poured) into the mold encapsulating the gasket 300. Once potted, the filter medium 210 may be placed into the mold such that outlet projection is within the interior space 218 (e.g., aligned along longitudinal axis 110). The first end 212 is brought into contact with the liquid material within the mold forming an interface therebetween. In some embodiments, as described above, the filter medium 210 may also contact the gasket 300. The liquid material may then be cured using known methods to solidify and set the liquid material thereby forming the first end cap 400. As such, the first end cap 400 is fixedly attached (e.g., mated) to the first end 212 of the filter medium 210 at the contact interface and the molded gasket 300 is encapsulated within the material of the first end cap 400. By virtue of the curing process, the gasket 300 is integrally encapsulated within end cap assembly 150 and integrally connected to the filter medium 210, to form an integral body of the filter element 200 that may remain inseparable during use and replacement. In some embodiments, the second end cap 240 may be similarly potted on the second end 214 of the filter medium 210 using the same or different liquid material, without the gasket 300. While in other embodiments, the second end cap 240 may be formed by other processes.

While the filter element 200 is shown in FIG. 6 having the end cap assembly 150 at the first end 212 of the filter medium 210, other configurations are possible. For example, FIGS. 7 and 8 are exploded perspective views of example filter elements 250 and 260 that used in the fluid filter system of FIG. 1. The filter elements 250 and 260 may be substantially similar to filter element 200, except that the configuration of the end cap assembly 150 and second end cap 240 may be different. FIG. 7 illustrates an end cap assembly 152 formed at the second end 214 of the filter medium 210. That is, in certain embodiments, the end cap assembly 152 may comprise the gasket 300 encapsulated within the second end cap 240 fixedly attached to the second end 214 of the filter medium 210 in a manner substantially similar to that described above. In this embodiment, the first apertures 322 may not be part of the primary fluid flow path (e.g., receiving unfiltered fluid from the inlet chamber) and instead permit fluid to drain through apertures 322 during replacement. In the illustrated example, the outer seal member 320 may be axially disposed between the second end cap 240 and the first end 212 of the filter medium.

FIG. 8 illustrates another example filter element 260 having a first end cap assembly, such as end cap assembly 150, and a second end cap assembly, such as end cap assembly 152, formed at the first end 212 and second end 214 of the filter medium 210, respectively. That is, in certain embodiments, the first end cap assembly 150 may be as described herein and the second end cap assembly 152 may be as described above in connection to FIG. 7. While illustrative examples are provided herein, it will be appreciated that filter elements 200, 250, and 260 are not mutually exclusive and the configurations of each may be possible. For example, in any of the preceding embodiments, the gasket 300 may be vertically flipped such that the outer seal member 320 may be may be axially disposed to not overlap with the filter medium 210 (e.g. no between the second end cap 240 and first end 214), that is, away from the second end 214 and first end 212 of the filter medium.

FIG. 9 is a cross-sectional view of the fluid filter system of FIG. 1 taken along a cross-sectional plane B including a further embodiment of gasket 900. Gasket 900 may be substantially similar to gasket 300, except that the configuration of the arms 940 is different than the arms 340 of gasket 300. As such gasket 900 may comprise the same parts and reference numbers as used in connection with gasket 300, except as provided herein. That is, for example, gasket 900 includes the outer seal member 310 having the seat interface 350 and the centering member 320 concentric to with the outer seal member 310 about the longitudinal axis 390. The gasket 900 also includes a plurality of arms 940, each comprising a first portion 942 and a second portion 944. The first portion 944 may extend axially from the first surface 410 of the first end cap 400 toward the outer seal member 320 to an intersection portion 946. The second portion 944 may extend radially from the outer seal member 320 toward the first end cap 400 and meeting the first portion 944 at the intersection portion 946 (e.g., a bend, turn, etc.). In some embodiments, the second portion 944 may be formed to be substantially perpendicular to a longitudinal axis 390 of gasket 900. In some embodiments, alone or in combination, the first portion 942 may be formed to be substantially parallel to the longitudinal axis 390. Thus, the first portion 942 and second portion 944 may be angularly offset by an angle of approximately 90 degrees. However, because the arms are formed of a flexible material, the relative orientations may be modified upon installation within the fluid filter system 100 so to absorb tolerance mismatch and discrepancies between the various components therein. In some embodiments, the angular offset between the second portion 944 and first portion 942 may be an obtuse angle such that the first portion 944 extends at an angle relative to 90 degrees toward the outer seal member 320.

The gasket 900 also includes a third portion 945 encapsulated within the first end cap 400 that extends radially from the centering member 310 (e.g., similar to the first portion 342 of gasket 300) toward the outer seal member 320, intersects the third member 330 at intersection 348, and meets the first portion 942 at an intersection portion 949. In various embodiments, the first portion 942 may be angularly offset from the third portion 945 at an angle of approximately 90 degrees, while in other embodiments the angular offset may be an obtuse angle toward the outer seal member 320.

INDUSTRIAL APPLICABILITY

The disclosed fluid filter system may be applicable to filter any type of fluid and may provide a seal between a flow of unfiltered fluid and a flow of filtered fluid without requiring numerous, complex shaped components and/or components requiring high manufacturing tolerances. The operation of fluid filter system 100 is explained below.

Referring to FIG. 1, fluid filter system 100 may receive unfiltered fluid into inlet port 510 and inlet chamber 530 from one or more upstream components of a fluid system. The unfiltered fluid may flow from inlet chamber 530 radially outward along and may be directed by end cap assembly 150 to flow toward container 700 through first apertures 322. The unfiltered fluid may flow through one or more first apertures 322 in, for example, a substantially axial direction through first apertures 322, 922, and into the radial space between container 700 and filter medium 210. The unfiltered fluid may then flow generally radially through filter medium 210 and filter medium 210 may trap particles suspended within the unfiltered fluid to filter the fluid. The filtered fluid may then flow through perforations 226 and thus through sleeve 220 and into interior space 218. The filtered fluid may flow from interior space 218 through to downstream components, e.g., through filter element outlet 405 of end cap assembly 150, and through outlet boss 610 of outlet partition 600 into the outlet chamber 630. The filtered fluid may further flow through outlet port 520 and toward one or more downstream components of the fluid system.

It may be desirable to replace filter element 200 because filter medium 210 may be saturated with trapped particles, outer seal member 320, 920 or gasket 300, 900 generally may be deteriorated, a maintenance period has elapsed, and/or because of any other rationale known in the art. An operator may unthread drain plug 800 from base plate 500, separate base plate 500 from container 700, extract the old or used filter element 200 from within container 700, and may insert a new or unused filter element 200 into container 700. As such, lip 710 and recessed engagement interface 560 may be unseated and/or disengaged from seat interface 350, 950 of the outer seal member 320, 920 as the old end cap assembly 150 is removed with the old filter element 200. The operator may insert a new filter element 200 into container 700 by seating the recessed engagement interface 354, 954 onto lip 710 and engage recessed engagement interface 560 of base plate 500 with the protruding engagement interface 352, 952 of gasket 300, 900. The operator may then insert the drain plug 800 into the drain bore 745 and retread the end 812 to base plate 500 via pocket 550. As such, outer seal member 320, 920 may be compressed via clamping between base plate 500 and container 700 as the new end cap assembly 150 between base plate 500 and container 700. It is contemplated that the operator may remove some or all of the fluid retained within container 700 in conjunction with and/or after removing old filter element 200, for example, via drain bore 745 or container cavity 730. In various embodiments, the old end cap assembly 150 is removed along with the old filter element 200 due to fixedly interlocking attachment therebetween, as described above.

However, variations and discrepancies in tolerances between the components of the fluid filter system 100 (e.g., the container 700, base plate 500, outlet partition 600, drain plug 800, filter medium 210, etc.) during manufacture may cause misalignments within the fluid filter system 100. For example, the drain boss 740 and pocket 550 may not be precisely aligned along the longitudinal axis 110, the lip 710 or radially facing surface of the side wall 524 may not be precisely aligned relative to each other or perpendicular to the longitudinal axis 110, the side wall 620 may be axially longer than anticipate, or numerous other misalignments may be present. As another example, in conventional filter systems, if a top end cap is not squarely positioned relative to the filter element (e.g., off from 90 degrees) then a conventional rigid between a container and a base plate may cause the bottom end of the filter element to move positions and fail to aligned with the longitudinal axis of the container. This may cause improper sealing and fluid leaks at both the top and bottom end caps.

The end cap assembly 150 is provided having elastomeric properties (e.g., elasticity, tensile strength, elongation, resiliency, etc.) to permit axial and radial movement for self-centering of the end cap assembly 150 (and filter element 200 attached thereto) with respect to the various components of the fluid filter system 100, for example, during replacement and insertion of the new filter element 200 therein. That is the outer seal member 320, 920 and/or arms 340, 940 may flex, bend, compress, elongate, etc. in accordance with the properties of material thereof to absorb variations in tolerances between interfacing components of the fluid filter system 100, thereby providing means for aligning and self-centering the filter element 200 with respect to the fluid filter system 100. This permits the gasket 300, 900 to allow for axial and radial adjustment of the position and orientation of the filter element 200 relative to the other components during installation. For example, with reference to FIGS. 3 and 7, after removal of the old or used filter element 200, the new filter element 200 may be inserted into container 700 by coupling second end 214 of the filter element 200 to the container 700 adjacent to the end wall 720. The outer seal member 320, 920 of the end cap assembly 150 may interface with the outer wall 715 via engagement of the seat interface 350, 950 and lip 710, which may provide for approximate alignment of the filter element 200 within the container 700 and hold the filter element 200 in approximate alignment during replacement. The base plate 500 (and/or outlet partition 600) may be installed at the container cavity 730 of the container 700, attaching to the filter element 200 therein, and, due to tolerance mismatch, may exert an axial and/or radial force to the filter element 200 in order to fit properly. The gasket 300, 900 thus permits the filter element 200 to absorb these axial and radial forces and shift the filter element 200 relative to either the container 700 and/or the base plate 500 to be properly aligned (e.g., self-centered) and installed within both components. For example, the drain plug 800 may threadingly engage with the pocket 550 pulling base plate 500 toward to the container 700 along the longitudinal axis 110. Such axial movement draws the outlet boss 610 into position with respect to the filter element outlet 405 and may exert an axial pressure toward on the filter element 200 to toward the end wall 720. The elastomeric properties of the gasket 300, 900, e.g., compression of the arms 340, 940 and/or outer member 320, 920, permit the filter element 200 to move into a desired position as needed. The arms 340, 940 may also be compressed, bent, and/or elongated in a direction perpendicular to the longitudinal axis 110 (e.g., radially about, outward from, inward toward the longitudinal axis 110) to facilitate self-centering of the filter element 200 with respect to the longitudinal axis 110. Similarly, the outer member 320, 920 may be compressed, elongated, or deformed as needed to ensure proper fit between the base plate 500 and container 700. As such, in another example, even if a first end cap 400 or second end cap 240 are not squarely positioned relative to the filter element 200 (e.g., off from 90 degrees) the gasket 300, 900 via arms 340, 940 and/or outer seal member 320, 920 may absorb the discrepancies therebetween and to facilitate alignment of the filter element 200 along the longitudinal axis 110 and ensuring proper sealing within the fluid filter assembly 100.

As container 700 and filter element 200 are interconnected with base plate 500, outer seal member 320 may form a seal between base plate 500 and container 700, e.g., between fluid filter system 100 and the environment and first end cap 400 and second end cap 240 may form a seal between inlet chamber 530 and chamber 630, e.g., between the unfiltered and filtered fluid flows. For example, outer seal member 320, 920 may be positioned atop outer wall 715 at the top portion 710 and between outer wall 715 and base plate 500. Outer seal member 320, 920 may be compressed therebetween as a function of drain plug 800 being threadingly engaged with base plate 500 at end 812, e.g., pocket 550, while head end 820 of the drain plug 800 is engaged or coupled to the drain boss 740 at the end wall 720. Compression of the outer seal member 320, 920 between the container 700 and base plate 500 may establish one or more axially facing seal interfaces, e.g., a seal against an axially facing surface of container 700 and/or base plate 500 (e.g., axially facing surface of the recessed engagement interface 560). The outer seal member 320, 920 may also be compressed against either or both of container 700 or base plate 500 and that outer seal member 320, 920 may additionally and/or alternatively establish a radially facing seal interface with respect to either or both of container 700 (e.g., surface at lip 710) or base plate 500 (e.g., a radially facing surface of the recessed engagement interface 560). Additionally, outlet boss 610 may be aligned with inner seal surface 430 and may be inserted therein past as the first surface 410 (e.g., interface of between the filter medium 210 and first end cap 400). Insertion of the outlet boss 610 may radially compress the first end cap 400 as a function of the distance between the axially facing inner seal surface 430 and the axial facing surface of the outlet boss 610, and may, for example, establish an axially facing seal interface, e.g., a face seal against the axial surface of the inner seal surface 430.

Because gasket 300, 900 may be integral with first end cap 400, container 700 and filter element 200 may be sealed with respect to base plate 500 and fluid filter system 100 may include a less complex fluid filter system. Furthermore, the integral filter element 200 provides for absorbing tolerance mismatch between components of the fluid filter system 100 and self-centering of the fluid filter element 200 relative to these components, Although this invention has been shown and described with respect to detailed embodiments and examples thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of engine. For example, the described embodiments may be applied to generators, engines, machinery, equipment, or any variant thereof. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

It will be understood that the benefits and advantages described above may relate to one embodiment or may relate to several embodiments. It is appreciated that features shown or discussed in one embodiment or example can be combined with other features shown or discussed in other embodiments and examples. The embodiments are not limited to those that solve any or all of the stated problems or those that have any or all of the stated benefits and advantages.

What is claimed is:

1. A filter element comprising:
   a filter medium having a first end and a second end opposite the first end and a longitudinal axis between the first end and the second end; and
   at least one end cap assembly fixedly attached to the first end of the filter medium, the at least one end cap assembly including:
   an end cap having a first toroidal shape with a filter element outlet aligned with the longitudinal axis and proximate to the first end of the filter medium, wherein the end cap is configured to engage an outlet boss of a base plate with a gasket and the end cap encloses and seals the first end of the filter medium,
   a first member having a second toroidal shape concentric with the end cap with respect to the longitudinal axis, the first member disposed radially outward from the end cap and the filter medium and disposed axially between the end cap and the second end of the filter medium, wherein the first member includes a first engagement interface configured for engagement with the base plate and includes a second engagement interface configured for engagement with a lip of a container, wherein together the base plate and the container house the filter element therein,
   a plurality of arms connecting the end cap with the first member, each arm comprises a first portion extending from the end cap to an intersection portion and a second portion extending from the intersection portion to the first member, the second portion angularly offset from the first portion,
   a second member radially inward of the first member so as to be positioned between the first member and the longitudinal axis, wherein the second member is configured to engage the first end of the filter medium and is connected to the first member by the plurality of arms, and
   wherein the second member and at least a part of the first portion of each of the plurality of arms are encapsulated within the end cap.

2. The filter element of claim 1, wherein the at least one end cap assembly is an integral body, at least the first member and the plurality of arms comprises an elastomeric material and the end cap comprises a solid setting resin material.

3. The filter element of claim 1, wherein the end cap is fixedly formed onto the first end of the filter element.

4. The filter element of claim 1, wherein each first portion of the plurality of arms originates from the second member and extends linearly to the intersection portion.

5. The filter element of claim 4, further comprising at least a third member between the second member and the first member, wherein the third member is encapsulated by the end cap.

6. The filter element of claim 5, the second member and the third member are coplanar.

7. The filter element of claim 4, wherein the second member includes a plurality of raised surfaces spaced about the longitudinal axis equidistant from each other, wherein the plurality of raised surfaces protrude through the gasket and are configured to provide proper axial alignment between the end cap and the gasket.

8. The filter element of claim 1, wherein the first portion extends axially from the end cap toward the first member, and the second portion extends radially from the intersection portion to the first member.

9. The filter element of claim 1, wherein the first portion extends radially from the end cap, and the second portion extends axially from the intersection portion to the first member.

10. A filter element comprising:
- a filter medium having a first end and a second end opposite the first end and a longitudinal axis between the first end and the second end; and
- at least one end cap assembly fixedly attached to the first end of the filter medium, the at least one end cap assembly including:
- an end cap having a first toroidal shape with a filter element outlet aligned with the longitudinal axis and proximate to the first end of the filter medium, wherein the end cap is configured to engage an outlet boss of a base plate with a gasket and the end cap encloses and seals the first end of the filter medium,
- a first member having a second toroidal shape concentric with the end cap with respect to the longitudinal axis, the first member disposed radially outward from the end cap and the filter medium and disposed axially between the end cap and the second end of the filter medium,
- a plurality of arms connecting the end cap with the first member, each arm comprises a first portion extending from the end cap to an intersection portion and a second portion extending from the intersection portion to the first member, the second portion angularly offset from the first portion,
- a second member radially inward of the first member so as to be positioned between the first member and the longitudinal axis, wherein the second member is configured to engage the first end of the filter medium and is connected to the first member by the plurality of arms, and
- wherein the second member and at least a part of the first portion of each of the plurality of arms are encapsulated within the end cap.

11. The filter element of claim 10, wherein the first portion extends axially from the end cap toward the first member, and the second portion extends radially from the intersection portion to the first member.

12. The filter element of claim 10, wherein the first portion extends radially from the end cap, and the second portion extends axially from the intersection portion to the first member.

13. The filter element of claim 10, wherein the at least one end cap assembly is an integral body, at least the first member and the plurality of arms comprises an elastomeric material and the end cap comprises a solid setting resin material.

14. The filter element of claim 10, wherein the end cap is fixedly formed onto the first end of the filter element.

* * * * *